US011522631B2

(12) United States Patent
Clatanoff et al.

(10) Patent No.: US 11,522,631 B2
(45) Date of Patent: Dec. 6, 2022

(54) SWITCHING AT A TERMINAL END TRANSCEIVER BETWEEN PRIMARY AND AUXILIARY COMMUNICATION PATHS

(71) Applicant: CORNING RESEARCH & DEVELOPMENT CORPORATION, Corning, NY (US)

(72) Inventors: William Jeffrey Clatanoff, Austin, TX (US); Donald Kent Larson, Cedar Park, TX (US); Raman Kumar Selli, Austin, TX (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 17/182,326

(22) Filed: Feb. 23, 2021

(65) Prior Publication Data
US 2021/0281352 A1     Sep. 9, 2021

Related U.S. Application Data

(60) Provisional application No. 62/984,939, filed on Mar. 4, 2020.

(51) Int. Cl.
*H04B 10/27*     (2013.01)
*H04J 14/02*     (2006.01)
(Continued)

(52) U.S. Cl.
CPC .......... *H04J 14/0269* (2013.01); *H04B 10/25* (2013.01); *H04B 10/27* (2013.01);
(Continued)

(58) Field of Classification Search
CPC ........ H04B 10/40; H04B 10/25; H04B 10/27; H04J 14/0269; H04Q 11/0067
See application file for complete search history.

(56) References Cited

U.S. PATENT DOCUMENTS 6,414,765 B1 *  7/2002  Li .................... H04B 10/032
                                                    398/5
7,046,619 B2     5/2006  Alagar et al.
(Continued)

FOREIGN PATENT DOCUMENTS

EP        1039670 A2    9/2000
WO    2010/093794 A1    8/2010

OTHER PUBLICATIONS

Fiber indexing: a cost-optimized approach to FTTH networks, Commscope, 2018, 3 pages, https://www.commscope.com/globalassets/digizuite/2513-fiber-indexing-a-cost-optimizing-approach-wp-110968-en.pdf?r=1.
(Continued)

*Primary Examiner* — Dzung D Tran
(74) *Attorney, Agent, or Firm* — William D. Doyle

(57) ABSTRACT

Disclosed herein are switch devices in terminal ends of a network and methods of using same. One embodiment relates to a terminal end of a network including a terminal end transceiver configured to communicate with one or more end user devices, and a switch device configured to automatically route communication at the terminal end transceiver between a primary communication path with a central office and an auxiliary communication path with the central office. Another embodiment relates to a method of switching between primary and auxiliary communication paths at a terminal end. Automatic switching is particularly applicable in a looped communication architecture with redundant communication paths for preventing interruption and increasing reliability for an improved user experience. Another embodiment relates to indexing with splices to reduce connections in a communication path and increase signal quality.

20 Claims, 11 Drawing Sheets

(51) Int. Cl.
  *H04B 10/25* (2013.01)
  *H04B 10/40* (2013.01)
  *H04Q 11/00* (2006.01)

(52) U.S. Cl.
  CPC ......... *H04B 10/40* (2013.01); *H04Q 11/0067* (2013.01); *H04Q 2011/0073* (2013.01)

(56) References Cited

U.S. PATENT DOCUMENTS

| | | |
|---|---|---|
| 8,249,450 B2 | 8/2012 | Conner |
| 8,737,837 B2 | 5/2014 | Conner et al. |
| 9,097,873 B2 | 8/2015 | Conner et al. |
| 9,188,759 B2 | 11/2015 | Conner |
| 9,207,421 B2 | 12/2015 | Conner |
| 9,348,096 B2 | 5/2016 | Parsons et al. |
| 2005/0036749 A1 | 2/2005 | Vogel et al. |
| 2011/0138064 A1* | 6/2011 | Rieger ............ H04N 21/433 709/228 |
| 2014/0226966 A1* | 8/2014 | Lutgen ............ H04B 10/032 398/5 |
| 2014/0254986 A1 | 9/2014 | Parsons et al. |
| 2018/0067261 A1 | 3/2018 | Larson et al. |
| 2018/0212706 A1* | 7/2018 | Ghuman ............ H04J 14/0204 |
| 2021/0014819 A1* | 1/2021 | Oduwaiye ............ H04W 28/16 |

OTHER PUBLICATIONS

European Patent Application No. 21159027.8, Extended European Search Report, dated Aug. 13, 2021; 9 pages European Patent Office.

Koonen T, "Fiber to the Home/Fiber to the Premises: What, Where, and When?", Proceedings of the IEEE, IEEE. New York, vol. 94, No. 5, May 2006, pp. 911-934.

\* cited by examiner

SWITCHING AT A TERMINAL END TRANSCEIVER BETWEEN PRIMARY AND AUXILIARY COMMUNICATION PATHS

PRIORITY APPLICATION

This application claims the benefit of priority of U.S. Provisional Application No. 62/984,939, filed on Mar. 4, 2020, the content of which is relied upon and incorporated herein by reference in its entirety.

BACKGROUND

The present disclosure relates to a terminal end in a communication network. In particular, the present disclosure relates to a terminal end transceiver of a terminal end in a communication network having a looped architecture for redundancy.

To improve network performance, communication and data networks are increasingly employing optical fiber. The benefits of optical fiber are well known and include higher signal-to-noise ratios and increased bandwidth. To further improve network performance, fiber optic networks are increasingly providing optical fiber connectivity all the way to end subscribers. These initiatives include various fiber-to-the-premises (FTTP), fiber-to-the-home (FTTH), and other fiber initiatives (generally described as FTTX). Other such initiatives include implementation of fiber optics in cellular networks, such as 5G cellular networks.

Methods of building fiber networks include aerial, directional boring, and micro-trenching techniques, which are generally complex, time consuming and/or capital intensive. Alternatively, nano-trenching involves cutting a shallower slot in the ground, which offers significant improvements in efficiency and cost over traditional micro-trenching, among other methods. However, due to the near-surface cable routing, the risk of signal interruption (e.g., from cable cuts) may increase, which may thereby increase service downtime and user dissatisfaction.

SUMMARY

One embodiment of the disclosure relates to a terminal end of a network including a terminal end transceiver configured to communicate with one or more end user devices, and a switch device configured to automatically route communication at the terminal end transceiver between a primary communication path and an auxiliary communication path, each of the primary communication path and the auxiliary communication path extending between the terminal end and a central office. Automatic switching is particularly applicable in a looped communication architecture with redundant communication paths for preventing interruption and increasing reliability for an improved user experience.

An additional embodiment of the disclosure relates to a method of using a terminal end of a network including receiving communication at a terminal end transceiver from at least one of a central office or an end user device. The method further includes automatically routing, by a switch device, communication at the terminal end transceiver along a primary communication path with a central office. The method further includes routing, by the switch device, communication at the terminal end transceiver along an auxiliary communication path with the central office upon a cessation in the communication along the primary communication path.

An additional embodiment of the disclosure relates to a network including at least one distribution cable including a first distribution cable and a second distribution cable. The first distribution cable includes a plurality of optical fibers including a first optical fiber, a second optical fiber, and a third optical fiber. The second distribution cable includes a plurality of optical fibers including a first optical fiber, a second optical fiber, and a third optical fiber, the second distribution cable spliced to the first distribution cable. The plurality of optical fibers of the second distribution cable are offset from the plurality of optical fibers of the first distribution cable for relative indexing therebetween, such that the second optical fiber of the first distribution cable is spliced with the first optical fiber of the second distribution cable, and the third optical fiber of the first distribution cable is spliced with the second optical fiber of the second distribution cable.

Additional features and advantages will be set out in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1A:
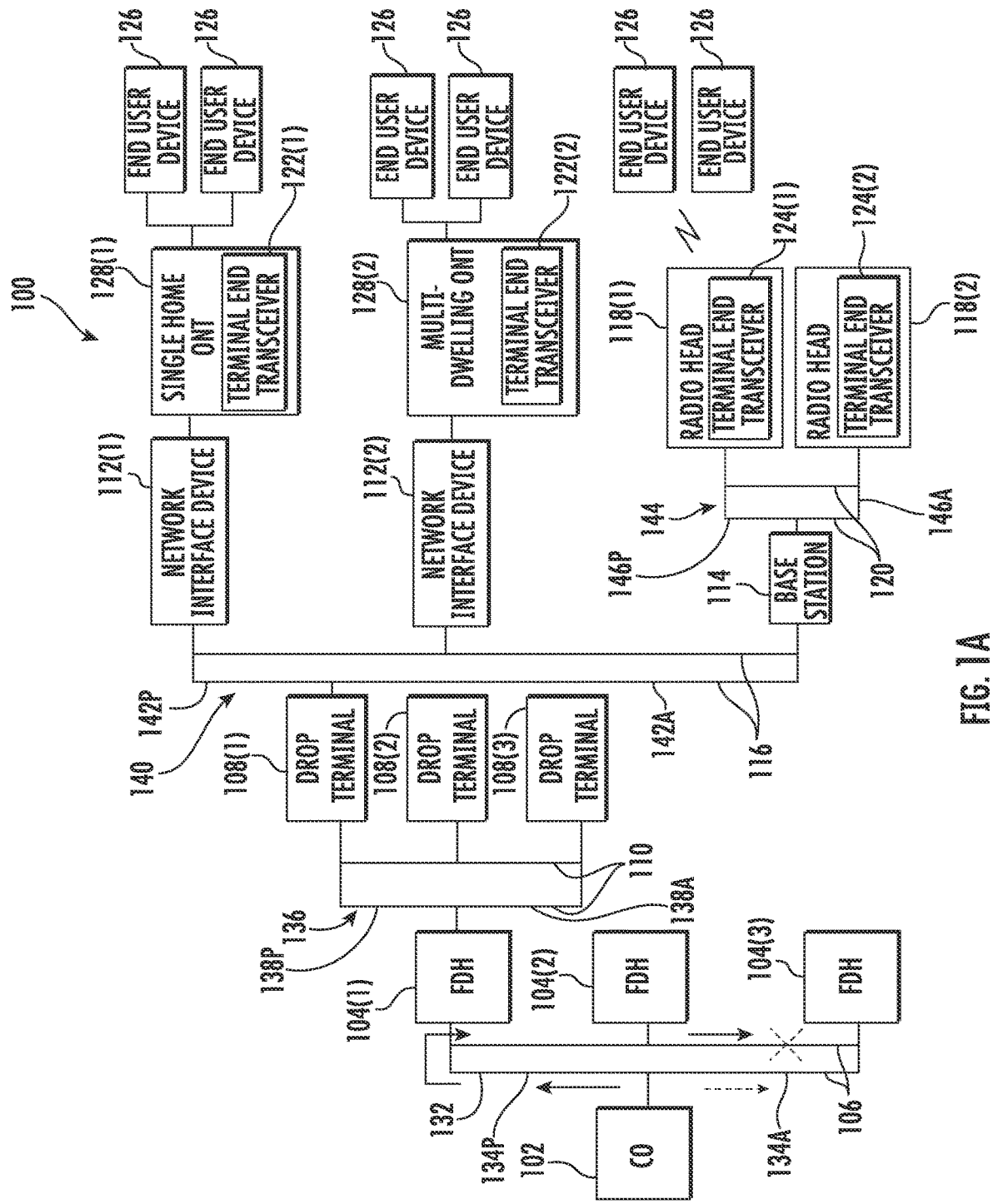
FIG. 1A is a diagram of a communication network illustrating a loop architecture providing redundant communication paths.

Reference will now be made in detail to the present preferred embodiments, examples of which are illustrated in the accompanying drawings. Whenever possible, the same reference numerals will be used throughout the drawings to refer to the same or like parts.

The embodiments set out below represent the information to enable those skilled in the art to practice the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The use herein of ordinals in conjunction with an element is solely for distinguishing what might otherwise be similar or identical labels, such as "first layer" and "second layer," and does not imply a priority, a type, an importance, or other attribute, unless otherwise stated herein.

The term "about" used herein in conjunction with a numeric value means any value that is within a range of ten percent greater than or ten percent less than the numeric value.

As used herein, the articles "a" and "an" in reference to an element refers to "one or more" of the element unless otherwise explicitly specified. The word "or" as used herein is inclusive unless contextually impossible. As an example, the recitation of A or B means A, or B, or both A and B.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The use herein of "proximate" means at, next to, or near.

The terms "left," "right," "top," "bottom," "front," "back," "horizontal," "parallel," "perpendicular," "vertical," "lateral," "coplanar," and similar terms are used for convenience of describing the attached figures and are not intended to limit this disclosure. For example, the terms "left side" and "right side" are used with specific reference to the drawings as illustrated and the embodiments may be in other orientations in use. Further, as used herein, the terms "horizontal," "parallel," "perpendicular," "vertical," "lateral," etc., include slight variations that may be present in working examples.

As used herein, the terms "optical communication," "in optical communication," and the like mean that two elements are arranged such that optical signals are passively or actively transmittable therebetween via a medium, such as, but not limited to, an optical fiber, connectors, free space, index-matching structure or gel, reflective surface, or other light directing or transmitting means.

As used herein, the term "port" means an interface for actively or passively passing (e.g., receiving, transmitting, or both receiving and transmitting) optical signals. A port may include, by way of non-limiting examples, one or more collimators, pigtails, optical connectors, optical splices, optical fibers, free-space, or a combination of the foregoing.

FIG. 1A is a block diagram of a communication network 100 (e.g., bi-directional passive optical network (PON), P2P network, etc.) illustrating loop architecture providing redundant communication paths between various network components. In certain embodiments, the communication network 100 is a cellular network (e.g., 1G, 2G, 3G, 4G, and/or 5G cellular network) fiber-to-the-premises (FTTP), fiber-to-the-home (FTTH), and/or other fiber initiatives (generally described as FTTX). The communication network may be an FTTX communication network, a cellular network, and/or a combination or multiple types of networks (e.g., an FTTX communication network and a cellular network).

The communication network 100 includes a central office (CO) 102 (may also be referred to as a head-end, network provider, etc.) in communication with one or more fiber distribution housings (FDH) 104(1), 104(2), 104(3) (referred to generally as fiber distribution housings (FDHs) 104) via one or more feeder cables 106. An FDH 104 (may also be referred to as a fiber distribution terminal, fiber distribution unit, local convergence point, network access point, etc.) is an enclosure that provides high density fiber termination optical cross-connect for routing optical signals. In certain embodiments, the FDHs 104 include a splitter (e.g., 1×4 splitter, 1×32 splitter, etc.). The communication network 100 further includes the one or more FDHs 104 in communication with one or more drop terminals 108(1), 108(2), 108(3) (referred to generally as drop terminals 108) via one or more distribution cables 110. A drop terminal 108 is an enclosure that provides connections to multiple endpoints in a fiber optic network. In certain embodiments, the drop terminal includes a splitter (e.g., 1×8 splitter, 2×8 splitter, etc.). The communication network 100 further includes the one or more drop terminals 108 in communication with one or more network interface devices (MD) 112(1), 112(2) (referred to generally as MD 112) and/or base stations 114 via one or more drop cables 116. In certain embodiments, the communication network 100 further includes the one or more base stations 114 in communication with one or more radio heads 118(1), 118(2) (referred to generally as radio heads 118) via one or more fiber optic cables 120. Accordingly, the CO 102 is in communication with one or more terminal ends (e.g., embodied as network interface devices 112 and/or radio heads 118), each including a terminal end device with an optical transceiver configured for a cellular network and/or an FTTX (e.g., FTTH). In particular, the single home ONT (optical network terminal) 128(1) and multi-dwelling ONT 128(2) each respectively include a terminal end device with an optical transceiver 122(1), 122(2) (referred to generally as terminal end transceivers 122) configured for an FTTX network, and the radio heads 118(1), 118(2) each respectively include a terminal end transceiver 124(1), 124(2) (referred to generally as terminal end transceivers 124) configured for a cellular network. In certain embodiments, the optical transceiver 122 is within the ONT 128. In certain embodiments, the optical transceiver 122 is plugged into the ONT 128.

Each of the terminal end transceivers 122, 124 are configured, either through wired or wireless connections, to communicate with one or more end user devices 126. In particular, in certain embodiments, the optical transceiver 122 communicates with one or more end user devices 126 indirectly through the ONT 128.

In certain embodiments, the terminal end is a single home ONT 128(1) configured for an FTTX network. For example, in certain embodiments, the communication network 100 is an FTTH network, and the terminal end is a NID 112 and is in optical communication with a CO 102 and a fiber distribution hub 104. In certain embodiments, the terminal end includes an NID 112 in communication with end user devices 126 in a single home unit ONT 128(1) (may also be referred to as a single home optical network unit (ONU)) and/or a multi-dwelling unit ONT 128(2) (may also be referred to as a multi-dwelling ONU). In other words, for example, the MD 112 may be in communication with a single home ONT 128(1) and one or more end user devices 126, and/or the MD 112 may be in communication with a multi-dwelling ONT 128(2) and one or more end user devices 126. In certain embodiments, the fiber optic cables in an FTTX network include bidirectional fibers. In certain embodiments, the terminal end transceiver comprises a bidirectional transceiver comprising a single optical fiber to transmit and receive for each of the primary channel and the auxiliary channel.

In certain embodiments, the terminal end is a radio head 118 configured for a cellular network. For example, in certain embodiments, the communication network 100 is a 5G cellular network, and the terminal end is a radio head 118. The radio head is part of a 5G cellular network and is in optical communication with a central office 102 and a fiber distribution hub 104. In particular, the terminal end may be embodied as a radio tower in communication with one or more end user devices 126, as in a cellular communication network (e.g., a 5G communication network). In certain embodiments, the radio tower includes a base station 114 and a radio head 118. In a 5G cellular network, the base station 114 is configured to be in a central location where significant processing capability is available and network paths can be consolidated, such as in an edge data center located nearer the radio cell sites. Many base stations 114 are thus expected to be located in one place serving a multitude of radio heads 118. In certain embodiments, this allows the primary and redundant pathways to also converge back to a single location where network functions are concentrated. In certain embodiments, the fiber optic cables in a cellular network include two unidirectional fibers, such as one fiber for transmitting signals (to the CO) and another fiber for receiving signals (from the CO). In certain embodiments, the terminal end transceiver comprises a unidirectional transceiver comprising a transmit optical fiber and a receive optical fiber for each of the primary channel and the auxiliary channel.

The communication network 100 includes one or more loops to provide redundant communication paths. For example, the CO 102 is in communication with at least one FDH 104 via one or more feeder cables 106 forming one or more first tier loops 132. The first tier loop 132 provides redundant communication paths between the CO 102 and each of the FDHs 104. For example, in certain embodiments, a primary communication path 134P extends clockwise around the first tier loop 132 from the CO 102 to the third FDH 104(3). If there is a disruption in the primary communication path 134P, the CO 102 instead communicates with the third FDH 104(3) along an auxiliary communication path 134A extending counter-clockwise around the first tier loop 132 from the CO 102.

Similarly, in certain embodiments, at least one FDH 104 is in communication with at least one drop terminal 108 via one or more distribution cables 110 forming one or more second tier loops 136 including a primary communication path 138P and an auxiliary communication path 138A. Further, in certain embodiments, at least one drop terminal 108 is in communication with at least one terminal end via a drop cable 116 forming a third tier loop 140 including a primary communication path 142P and an auxiliary communication path 142A. In certain embodiments, at least one base station 114 is in communication with at least one radio head 118 via a fiber optic cable 120 forming a fourth tier loop 144 including a primary communication path 146P and an auxiliary communication path 146A. In certain embodiments, the loop architecture includes more or fewer tiers of loops. In certain embodiments, the loop architecture includes more or fewer loops within each tier. Of course, the loops are merely illustrative, and may be any shape or size.

As noted above, with nano-trenching (and other methods), fiber cables close to or near the surface of a roadway increase vulnerability to disruption from everyday events, people, and/or vehicular traffic. This loop architecture provides connectivity redundancy which increases service uptime and customer satisfaction and minimizes risk of disruption. The loop architecture requires one or more routing elements and/or switches to facilitate communication between the CO 102 and end user devices 126.

Figure 1B:
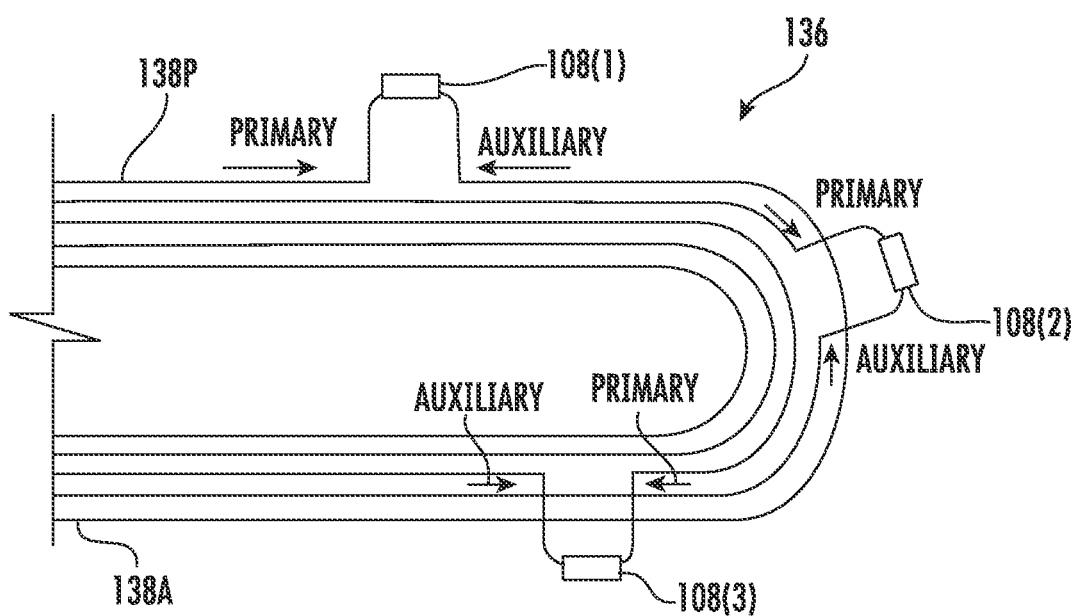
FIG. 1B is a diagram illustrating a looped architecture.

FIG. 1B is a diagram illustrating a looped architecture in more detail. In particular, illustrated is a second tier loop 136 including a primary communication path 138P and an auxiliary communication path 138A in communication with a plurality of drop terminals 108.

Figure 1C:
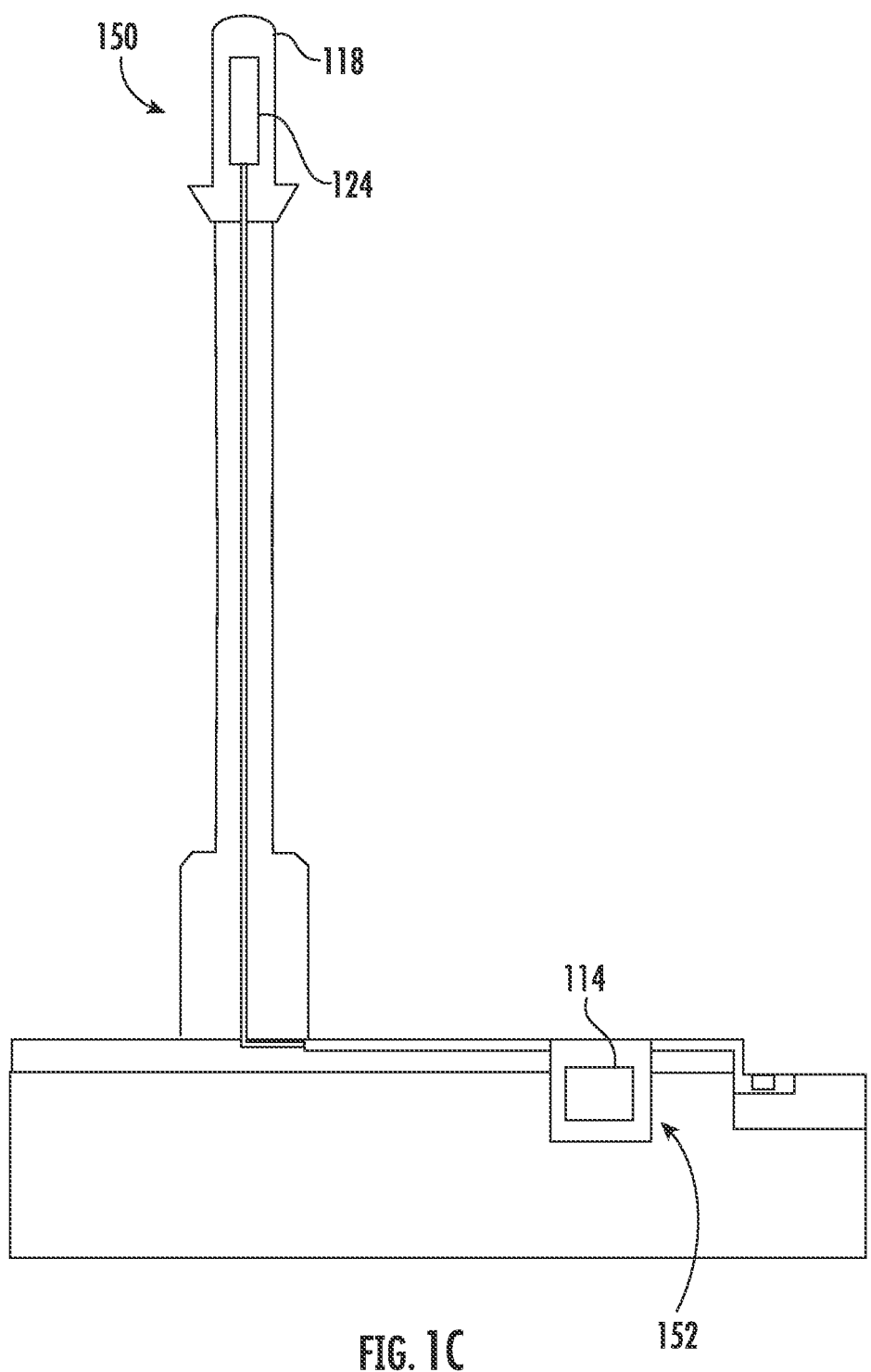
FIG. 1C is a diagram illustrating a radio tower of a cellular communication network.

FIG. 1C is a diagram illustrating a radio tower 150 of a cellular communication network including a radio head 118 at a top of the radio tower 150. As noted above, the radio head 118 includes a terminal end transceiver 124 for communication between the CO 102 and the radio head 118, facilitating communication with one or more end user devices 126 (see FIG. 1A). A base station 114 is positioned within a manhole 152 proximate the radio tower 150. In certain embodiments, the base station 114 is provided in a base of the radio tower 150. In certain embodiments, the radio head 118 may include a plurality of terminal end transceivers 124 to provide communication path redundancy.

Figure 2:
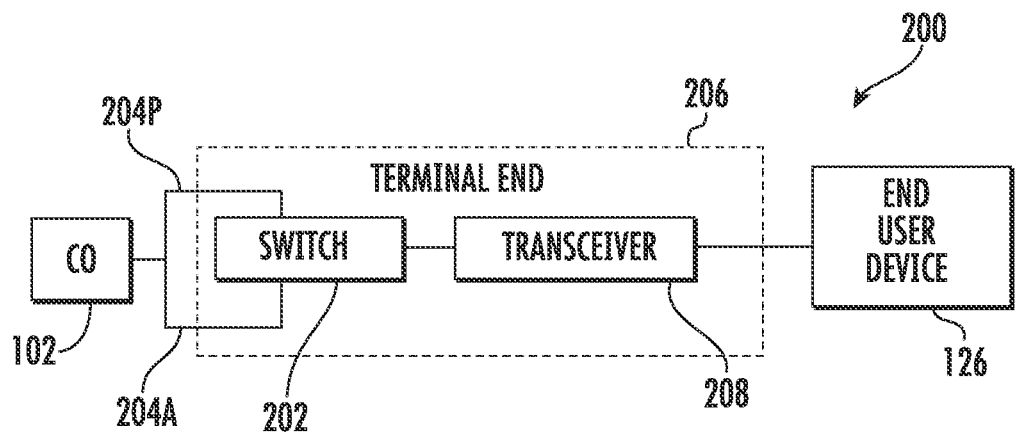
FIG. 2 is a diagram of a communication network illustrating a switch device configured to automatically switch between a primary communication path and an auxiliary communication path.

FIG. 2 is a diagram of a communication network 200 illustrating a switch device 202 configured to automatically switch between a primary communication path 204P and an auxiliary communication path 204A. In particular, a terminal end 206 of a communication network includes a terminal end transceiver 208 configured to communicate with a CO 102 and one or more end user devices 126. The switch device 202 is configured to automatically route communication at the terminal end transceiver 208 between a primary communication path 204P with the CO 102 and an auxiliary communication path 204A with the CO 102.

Figure 3:
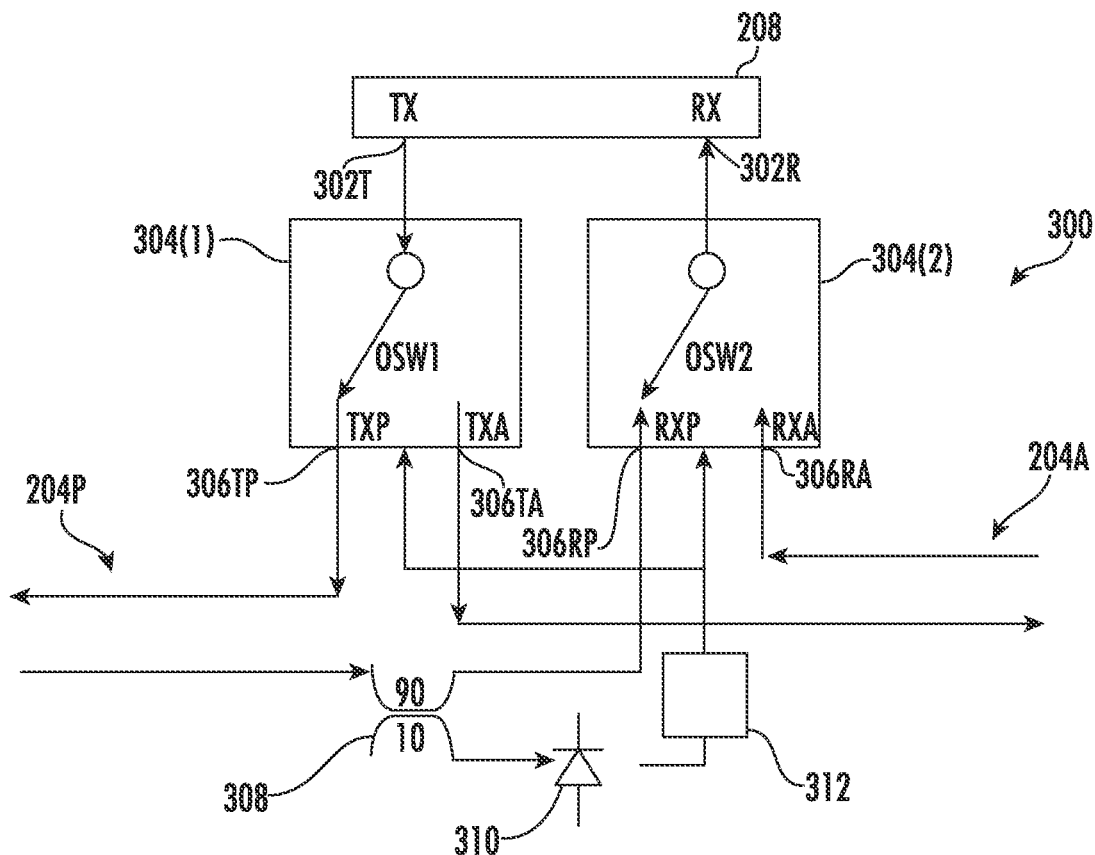
FIG. 3 is a diagram illustrating an optical switch device configured to automatically switch between a primary communication path and an auxiliary communication path.
Figure 4:
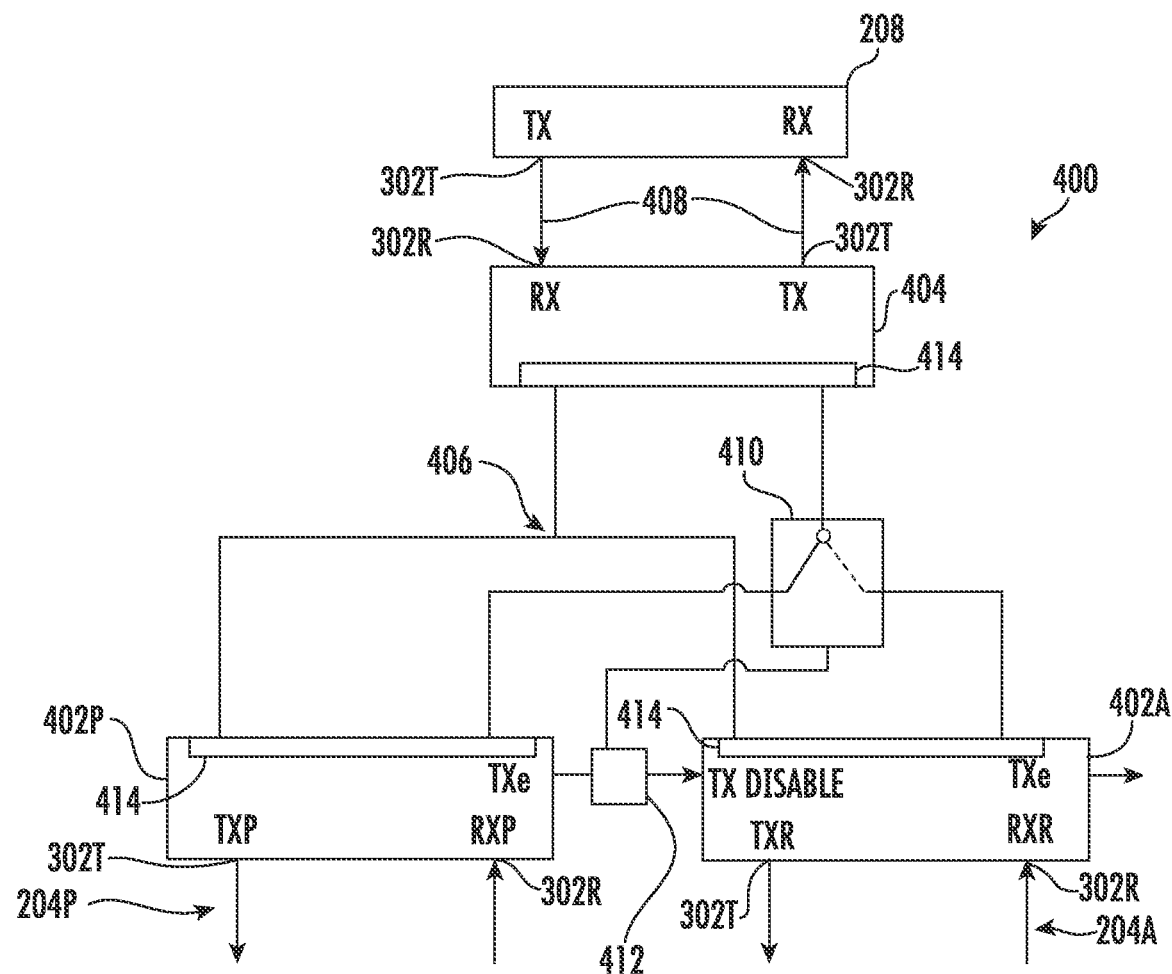
FIG. 4 is a diagram illustrating an electronic switch device configured to automatically switch between a primary communication path and an auxiliary communication path.
Figure 5:
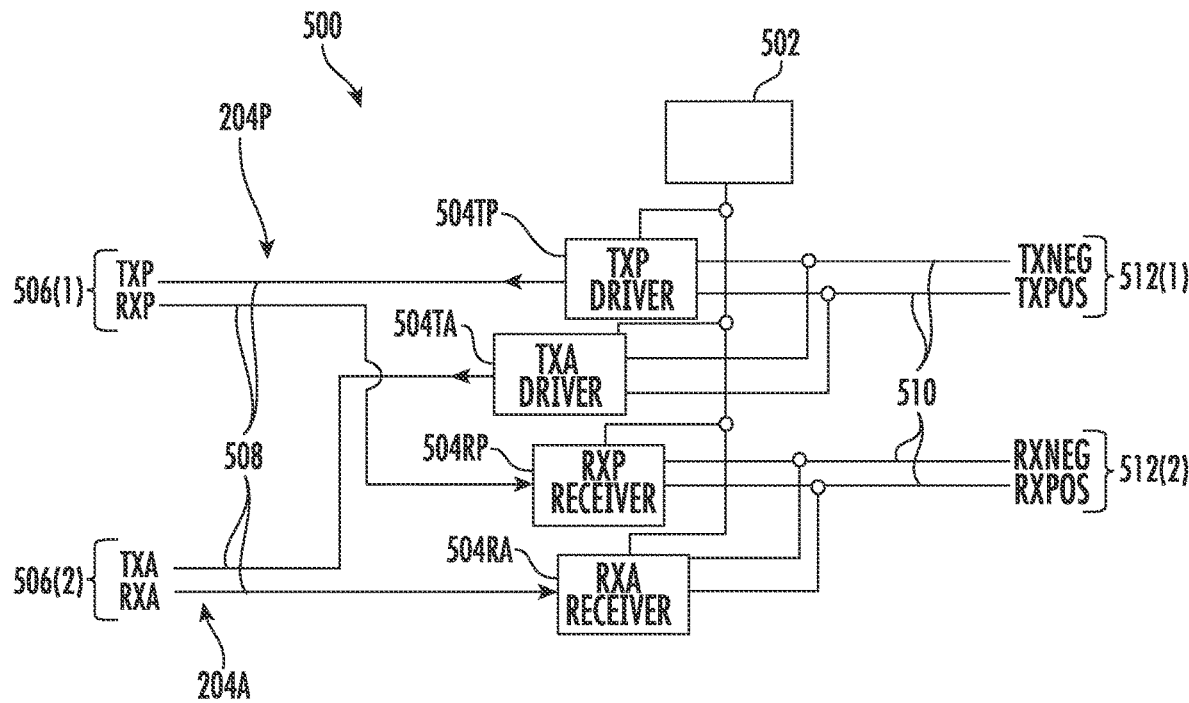
FIG. 5 is a diagram illustrating an optical transceiver module configured to automatically switch between a primary communication path and an auxiliary communication path.

FIGS. 3-5 are diagrams illustrating various optical switch devices for routing signals from the primary communication path 204P and the auxiliary communication path 204A to prevent signal redundancy and/or interference between the CO 102 and the one or more end user devices 126. In certain embodiments, the switch device 202 is external to the transceiver 208. In other embodiments, the switch device 202 is internal to the transceiver 208. For FIGS. 3-5, embodiments are directed to a cellular network, but it is noted that the features discussed therein are also applicable to an FTTX network. In certain embodiments, the terminal end further includes an external switch device comprising the switch device 202, the external switch device plugged into the terminal end transceiver 208. As used herein, TXP refers to a primary transmit optical fiber, RXP refers to a primary receive optical fiber, TXA refers to an auxiliary transmit optical fiber, and RXA refers to an auxiliary receive optical fiber. Although in these exemplary embodiments, unidirectional fibers are used in a cellular network, it is noted that such features may also be used with bidirectional fibers, such as in an FTTX communication network.

FIG. 3 is a diagram illustrating an optical switch device 300 configured to automatically switch between a primary communication path 204P and an auxiliary communication path 204A. The terminal end transceiver 208 includes a transmit port 302T and a receive port 302R. The optical switch device 300 is configured to plug into the terminal end transceiver 208 and includes a first optical switch 304(1) in communication with the transmit port 302T of the terminal end transceiver 208 and a second optical switch 304(2) in communication with the receive port 302R of the terminal end transceiver 208. In certain embodiments, each of the optical switches 304(1), 304(2) is a microelectromechanical (MEM) optical switch. MEM switches also offer fast switching speeds to switch from the primary communication path 204P to the auxiliary communication path 204A within a few micro or milliseconds, thus allowing the link protocols to handle any packets lost during the switch-over phase. The first optical switch 304(1) includes a primary transmit port 306TP in communication with the primary communication path 204P and an auxiliary transmit port 306TA in communication with the auxiliary communication path 204A. The second optical switch 304(2) includes a primary receive port 306RP in communication with the primary communication path 204P and an auxiliary receive port 306RA in communication with the auxiliary communication path 204A.

The optical switch device 300 further includes an optical splitter 308, a light detection circuit 310 configured to receive at least a portion of an optical signal from the primary communication path 204P via the optical splitter 308, and a switch control 312 to control the orientation of the first optical switch 304(1) and the second optical switch 304(2). For example, in certain embodiments, the switch control 312 receives about 10% of the optical signal from the primary communication path 204P, and propagates 90% of the optical signal to the second optical switch 304(2). If the switch control 312 detects an optical signal in the primary communication path 204P, then the switch control 312 operates the first optical switch 304(1) and the second optical switch 304(2) to the primary communication path 204P. If the switch control 312 does not detect an optical signal in the primary communication path 204P, then the switch control 312 flips the first optical switch 304(1) and the second optical switch 304(2) to the redundant auxiliary communication path 204A.

In other words, optical switch device 300 includes an optical switch 304(1), 304(2) configured to detect optical signals in the primary communication path 204P, and switch between the primary communication path 204P and the auxiliary communication path 204A depending on whether the optical signals are detected in the primary communication path 204P. The optical switch device 300 is configured to be externally plugged into the terminal end transceiver 208 such that the optical switch device 300 can operate as a retroactive solution. In certain embodiments, the optical switch device 300 is incorporated into the transceiver.

FIG. 4 is a diagram illustrating an electronic switch device 400 configured to automatically switch between a primary communication path 204P and an auxiliary communication path 204A. The terminal end transceiver 208 includes a transmit port 302T and a receive port 302R. The electronic switch device 400 is configured to plug into the terminal end transceiver 208. The electronic switch device 400 includes a primary transceiver 402P, an auxiliary transceiver 402A, and a converter transceiver 404. The primary transceiver 402P includes a transmit port 302T and a receive port 302R in communication with a primary communication path 204P. The auxiliary transceiver 402A includes a transmit port 302T and a receive port 302R in communication with an auxiliary communication path 204A. The converter transceiver 404 is in communication with the primary transceiver 402P and the auxiliary transceiver 402A via an electrical circuit 406. The converter transceiver 404 includes a transmit port 302T and a receive port 302R in communication with, respectively, the receive port 302R and the transmit port 302T of the terminal end transceiver 208 via optical fibers 408. The electrical circuit 406 includes an electrical switch 410 between the transmit port 302T of the converter transceiver 404 and each of the receive ports 302R of the primary transceiver 402P and the auxiliary transceiver 402A. In certain embodiments, the converter transceiver 404 is in selective communication with the primary transceiver 402P and the auxiliary transceiver 402A based on settings of the electrical switch 410 and is configured to output optical signals to the terminal end transceiver 208.

The electronic switch device 400 includes a switch control 412 configured to detect if signals are received at the receive port 302R of the primary transceiver 402P. If an optical signal is detected, the primary transceiver 402P sends a control signal via the switch control 412 to the electrical switch 410 and/or the auxiliary transceiver 402A. The control signal sent to the auxiliary transceiver 402A disables the transmit port 302T of the auxiliary transceiver 402A. Further, upon receiving the control signal, the electrical switch 410 is configured to switch between the electrical paths of the receive ports 302R of the primary transceiver 402P and the auxiliary transceiver 402A. If the switch control 412 detects an optical signal in the receive port 302R of the primary transceiver 402P from the primary communication path 204P, then the electrical switch 410 allows electrical signals to follow from the primary communication path 204P to the converter transceiver 404. If the switch control 412 does not detect an optical signal in the primary communication path 204P (e.g., received at the receive port 302R of the primary transceiver 402P)), then the switch control 412 flips the electrical switch 410 to the auxiliary communication path 204A. The electrical switch 410 is configured to switch between the primary communication path 204P and the auxiliary communication path 204A depending on whether signals are received in the primary communication path 204P. In other words, the electrical switch 410 is configured to switch the (high-speed) electrical connections between receive ports 302R of the primary transceiver 402P and the auxiliary transceiver 402A based on detection of an optical signal at the primary transceiver 402P. For example, in certain embodiments, when the primary transceiver 402P is active, the laser of the auxiliary transceiver 402A is switched off via the RX_disable function of the auxiliary transceiver 402A. Thus, when the primary communication path 204P is active, the primary transceiver 402P receive port is receiving a light signal, which is used to control whether the auxiliary transceiver 402A transmitter is enabled or not. In other words, in certain embodiments, the electronic switch device 400 is configured to disable transmission of the auxiliary transceiver 402A based on a receiver loss signal of the primary transceiver 402P.

In certain embodiments, the electronic switch device 400 includes a conversion unit 414 configured to convert optical signals to intermediate electrical signals. The electronic switch device 400 is externally plugged into the transceiver such that the electronic switch device 400 can operate as a retroactive solution. In certain embodiments, the electronic switch device 400 is incorporated into the transceiver.

FIG. 5 is a diagram illustrating an optical transceiver module 500 (may also be referred to as a controller module) configured to automatically switch between a primary communication path 204P and an auxiliary communication path 204A. In certain embodiments, a switch device 202 is embodied as the optical transceiver module 500 which is internal to the terminal end transceiver 208 (e.g., small form-factor (SFP) transceiver). In certain embodiments, the optical transceiver module 500 is external to the terminal end transceiver 208.

The optical transceiver module 500 includes a microcontroller 502 in electronic communication with a dual set of laser drivers (TXP driver 504TP, TXA driver 504TA) and a dual set of optical receivers (RXP receiver 504RP, RXA receiver 504RA). In other words, in certain embodiments, the switch device 202 includes a microcontroller 502 within the terminal end transceiver 208, where the terminal end transceiver 208 includes a primary channel in communication with the primary communication path 204P and an auxiliary channel in communication with the auxiliary communication path 204A. In such a configuration, when the RXP receiver 504RP receives optical signals, the microcontroller 502 disables the TXA driver 504TA and/or the RXA receiver 504RA).

In certain embodiments, the terminal end transceiver 208 is a dual port transceiver. The dual port terminal end transceiver 208 includes a first port 506(1) including channels TXP and RXP, and a second port 506(2) including channels TXA and RXA. It is noted that in certain embodiments, optical fibers 508 extend from the ports 506(1), 506(2) to the drivers 504TP, 504TA and receivers 504RP, 504RA, and electrical traces 510 extend from the drivers 504TP, 504TA, and receivers 504RP, 50411A. An advantage of a dual port transceiver is the ability to embody a small form factor (SFF) pluggable module because it would not require any external electronic hardware other than a new pluggable transceiver and would be less expensive and easier to implement. In certain embodiments, the microcontroller 502 communicates via a standard I2C interface (two-wire interface) with the TXP, TXA, RXP, RXA integrated circuits (ICs) and decides which of the pair of ICs communicates (high-speed) electrical signals. For example, the microcontroller 502 decides if TXP driver 504TP or TXA driver 504TA communicates with electrical transmit channel 512(1) along differential pair transmit electrical traces TXNEG and TXPOS and decides if RXP receiver 504RP or RXA receiver 504RA communicates with electrical receive channel 512(2) along differential pair receive electrical traces RXNEG and RXPOS.

Figure 6:
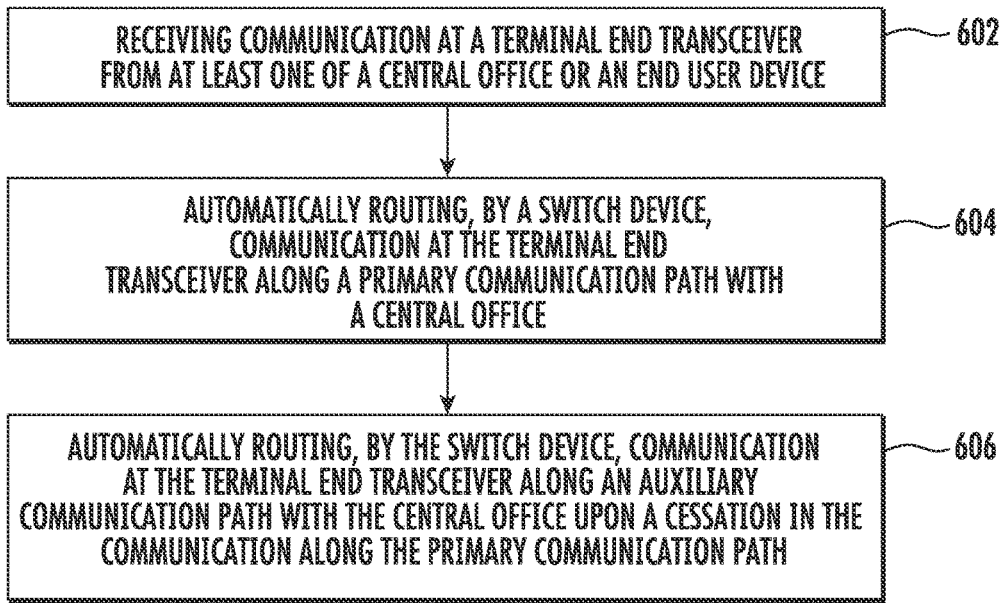
FIG. 6 is a flowchart illustrating a method of terminal end switching.

FIG. 6 is a flowchart 600 of steps for a method of using a terminal end of a network (e.g., terminal end switching). Step 602 includes receiving a communication signal at a terminal end transceiver 208 from at least one of a CO 102 or an end user device 126. Step 604 includes automatically routing, by a switch device 202, the communication signal at the terminal end transceiver 208 along a primary communication path 204P with a CO 102. Step 606 includes automatically routing, by the switch device 202, the communication signal at the terminal end transceiver 208 along an auxiliary communication path 204A with the CO 102 upon a cessation in the communication along the primary communication path 204P.

Figure 7:
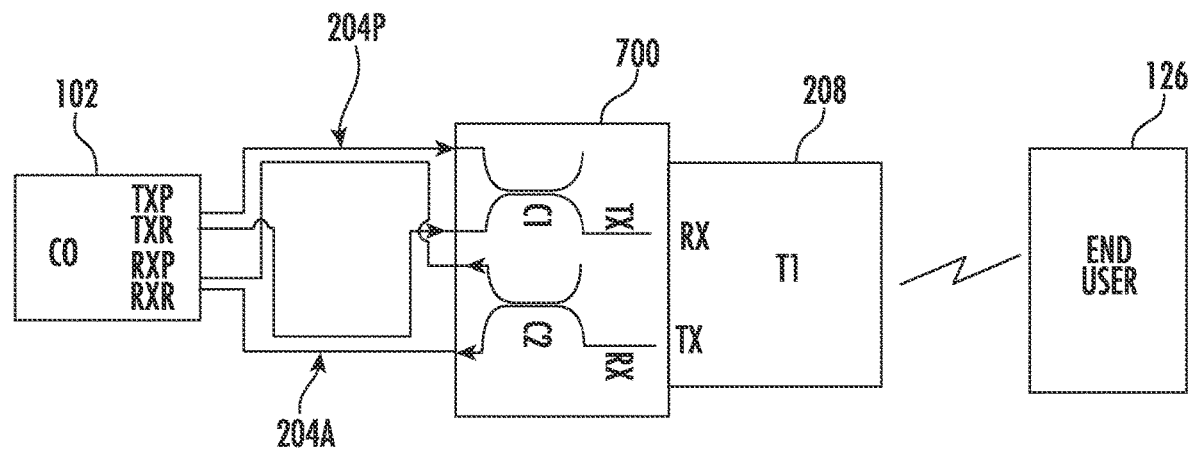
FIG. 7 is a diagram illustrating a routing element including an optical coupler and an optical splitter configured to couple and split optical communication signals between a central office, a single transceiver, and an end user.
Figure 8:
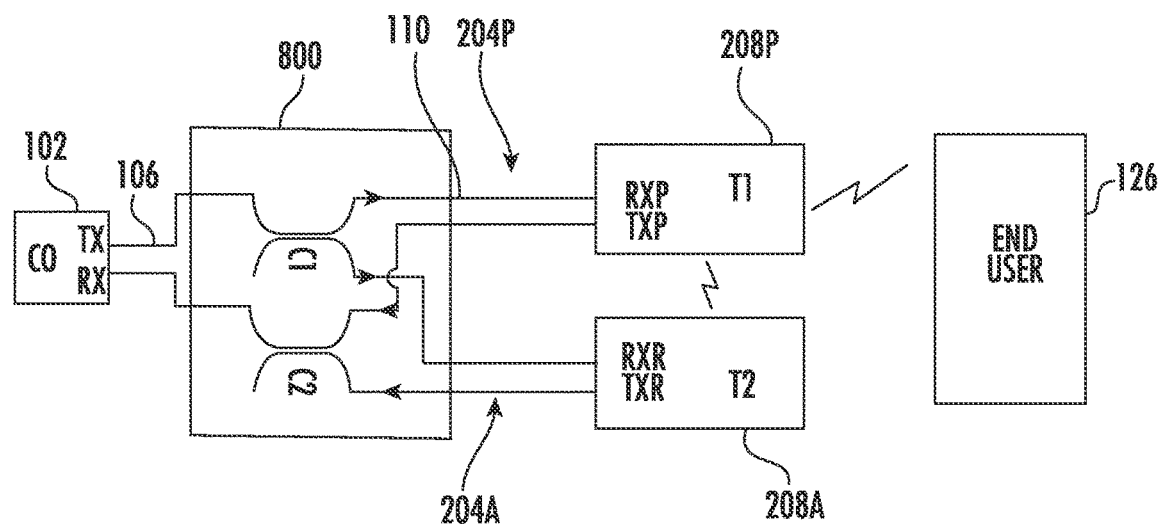
FIG. 8 is a diagram illustrating a routing element including an optical coupler and an optical splitter configured to couple and split light along two primary and auxiliary paths, allowing the formation of optical communications between a central office, two transceivers, and an end user.

FIGS. 7-8 are diagrams illustrating use of an optical routing element configured to couple and split optical communication signals between a CO 102 and an end user device 126. FIG. 7 is a diagram illustrating an optical routing element 700 configured to couple and split optical communication signals between a CO 102, a single transceiver 208, and an end user device 126, wired or wirelessly connected. In other words, the terminal end includes an optical routing element 700 (e.g., 3 dB splitter/coupler) configured to couple and split optical communication signals from a CO along one or both of a primary communication path 204P and an auxiliary communication path 204A and a single transceiver 208. An advantage offered by use of the routing element 700 is that no manual or field technician intervention is necessary to switch between primary and auxiliary paths, since there is a mechanism further upstream in the network to resolve any conflicts in two separate signal paths coming together.

FIG. 8 is a diagram illustrating a routing element configured to couple and split optical communication signals between a CO 102, two transceivers 208(1), 208(2), and an end user device 126. In other words, the terminal end includes two transceivers 208(1), 208(2), with distribution cables 110 in the primary communication path 204P positioned between the routing element 800 and the primary transceiver 208P, and distribution cables 110 in the auxiliary communication path 204A positioned between the routing element 800 and the auxiliary transceiver 208A.

Placement of the routing element 800 (e.g., 3 dB splitter/coupler) at the connection point between the feeder cables 106 and distribution cables 110 facilitates removal of any manual patching system requirement at the CO and/or at feeder/distribution cable connection points. As noted above, one option is to have a redundant port in a radio head (e.g., where the redundant port is activated at the loss of signal in the primary communication path 204P). In certain embodiments, the radio head may notify when the primary communication path 204P is lost. Additionally or alternatively, the radio head introduces a time lag between when one path loses an optical signal and the other is made active, which would allow the CO active equipment to raise a network failure flag in the network management system, notifying an operator that a fiber break occurred on a specific path.

Figure 9:
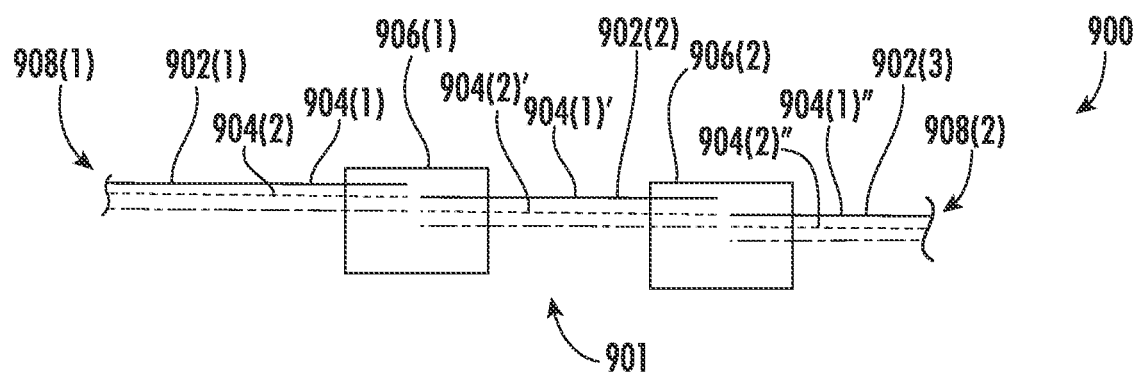
FIG. 9 is a diagram illustrating fiber optic indexing.

FIG. 9 is a diagram illustrating fiber optic indexing with splices. In particular, disclosed is a network 900 including at least one distribution cable assembly 901 including a first distribution cable 902(1) comprising a plurality of optical fibers including a first optical fiber 904(1) and a second optical fiber 904(2). The at least one distribution cable assembly 901 further includes a second distribution cable 902(2) comprising a plurality of optical fibers including a first optical fiber 904(1)' and a second optical fiber 904(2)', where the second distribution cable 902(2) is coupled to the first distribution cable 902(1) by a splice 906(1). The at least one distribution cable assembly 901 further includes a third distribution cable 902(3) including a plurality of optical fibers including a first optical fiber 904(1)" and a second optical fiber 904(2)", where the third distribution cable 902(3) is coupled to the second distribution cable 902(2) by a splice 906(2).

The plurality of optical fibers of the second distribution cable 902(2) are offset from the plurality of optical fibers of the first distribution cable 902(1) and the third distribution cable 902(3) for relative indexing therebetween such that the first optical fiber 904(1)' of the second distribution cable 902(2) forms a splice with the second optical fiber 904(2) of the first distribution cable 902(1), and the second optical fiber 904(2)' of the second distribution cable 902(2) forms a splice with the first optical fiber 904(1)" of the third distribution cable 902(3).

In certain embodiments, the at least one distribution cable assembly 901 includes a first distribution end 908(1) and a second distribution end 908(2) opposite the first distribution end 908(1), and the at least one distribution cable assembly 901 forms a loop such that the first distribution end 908(1) and the second distribution end 908(2) are each independently in optical communication with a data source.

Figure 10:
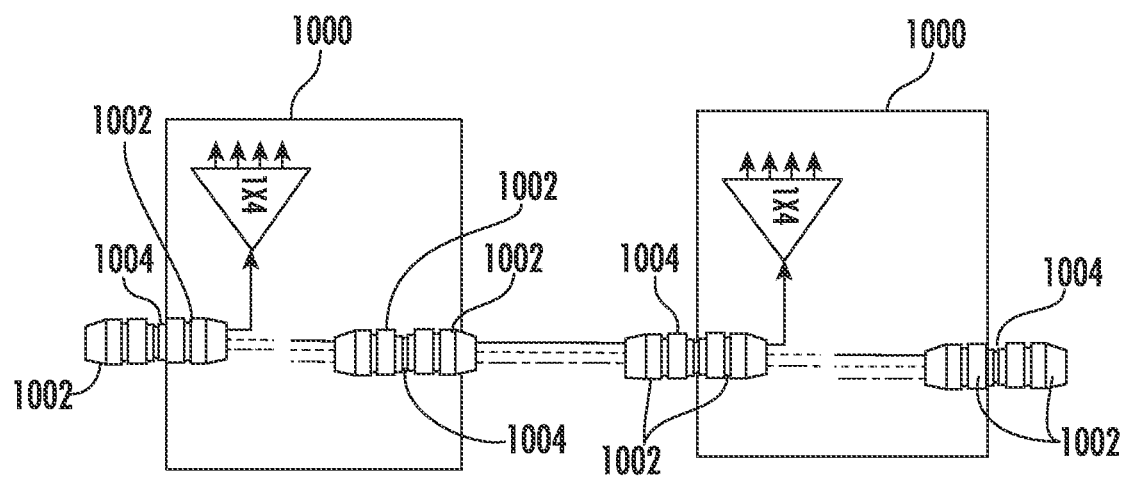
FIG. 10 is a diagram illustrating indexing between fiber optic terminals using connectors.

FIG. 10 is a diagram illustrating indexing between fiber optic terminals 1000 using connectors 1002. Each connection 1004 between the connectors 1002 introduces a loss in the signal. An advantage of using splices as in FIG. 9 is avoiding losses inherent to using connectors 1002 and where such losses build over increasing numbers of the connectors 1002 used in a communication path.

Figure 11A:
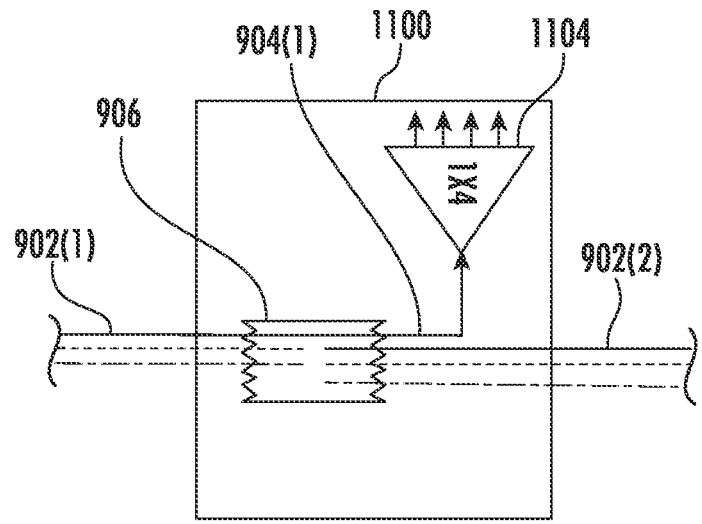
FIG. 11A is a diagram illustrating indexing in a fiber optic terminal using a splice with a drop occurring after a splice coupling.
Figure 11B:
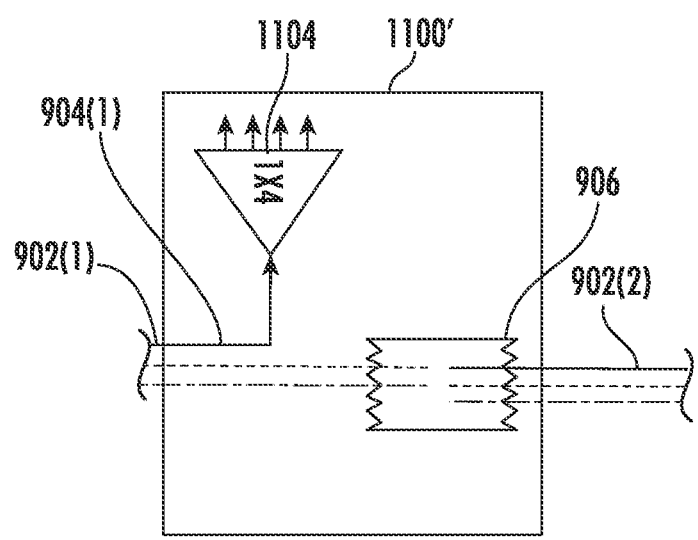
FIG. 11B is a diagram illustrating indexing in a fiber optic terminal using a splice with a drop occurring before a splice coupling.
Figure 11C:
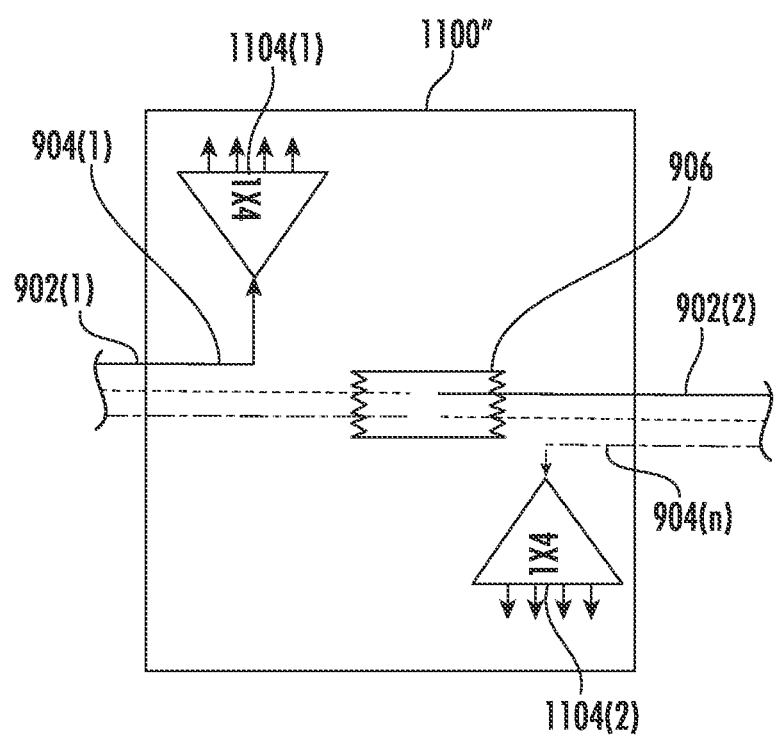
FIG. 11C is a diagram illustrating indexing in a fiber optic terminal using a splice in a bi-directional redundant loop architecture.
Figure 12:
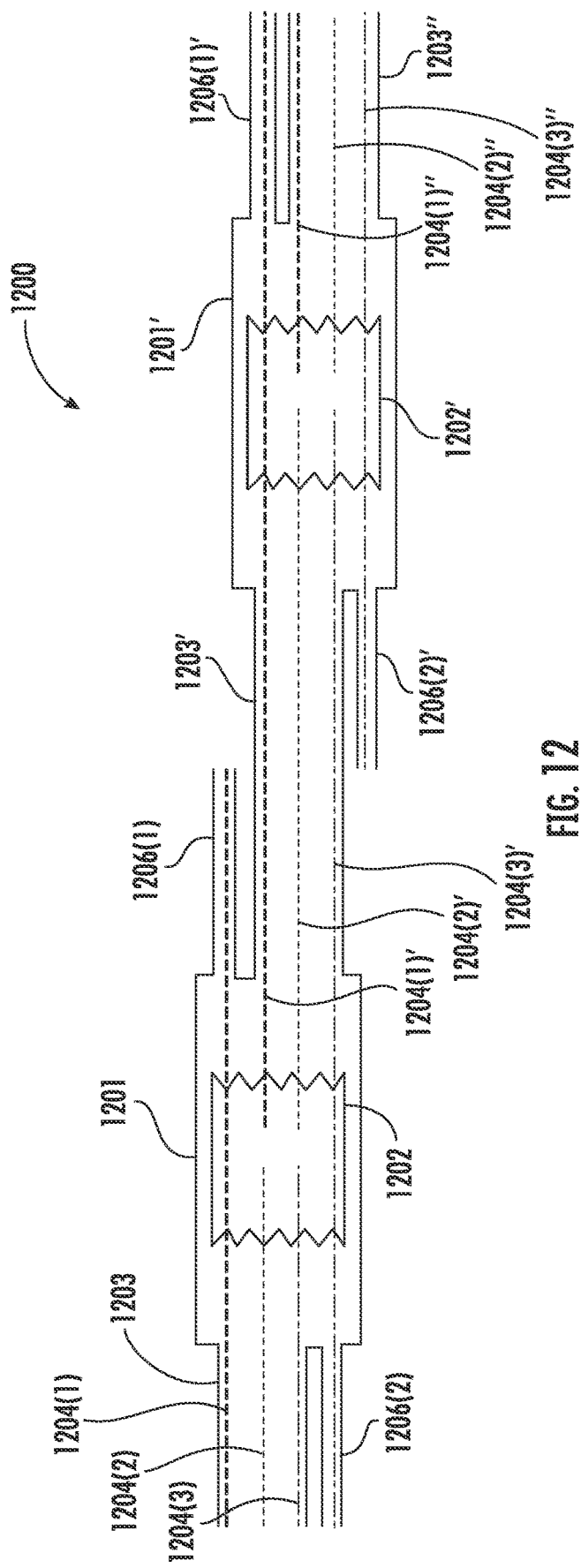
FIG. 12 is a diagram illustrating a distribution cable system including a first distribution cable assembly and a second distribution cable assembly.

FIGS. 11A-12 illustrate embodiments using splice connections. In particular, such embodiments require fewer couplings between distribution cables and reduce signal loss. It is noted that each of these embodiments may be daisy-chained together.

FIGS. 11A-11C illustrate a fiber optic terminal 1100, 1100', 1100" housing at least a portion of the first distribution cable 902(1) and the second distribution cable 902(2) and a splice 906 therebetween.

FIG. 11A is a diagram illustrating indexing in a fiber optic terminal 1100 using a splice 906 with a drop occurring after a splice coupling. In other words, the first optical fiber 904(1) of the first distribution cable 902(1) is routed to a splitter 1104 after the splice 906.

FIG. 11B is a diagram illustrating indexing in a fiber optic terminal 1100' using a splice 906 with a drop occurring before a splice coupling 906. In other words, the first optical fiber 904(1) of the first distribution cable 902(1) is routed to a splitter 1104 before the splice 906.

FIG. 11C is a diagram illustrating indexing in a fiber optic terminal 1100" using a splice 906 in a bi-directional redundant loop architecture. In other words, the first optical fiber 904(1) of the first distribution cable 902(1) extending in a first direction is routed to a first splitter 1104(1), and the last optical fiber 904(n) of the second distribution cable 902(2) extending in a second direction (opposite the first direction) is routed to a second splitter 1104(2).

FIG. 12 is a diagram illustrating a distribution cable system 1200 including a first distribution cable assembly 1201 and a second distribution cable assembly 1201' (referred to generally as a distribution cable assembly 1200). Where each distribution cable assembly 1200, includes a splice coupling 1202, 1202', such as for use in a looped architecture. In particular, the first distribution cable assembly 1201 includes a first distribution cable 1203 with a first optical fiber 1204(1), a second optical fiber 1204(2), and third optical fiber 1204(3) extending in a first direction. The first optical fiber 1204(1) is routed to a first drop cable 1206(1). The second optical fiber 1204(2) is spliced to a first optical fiber 1204(1)' of distribution cable 1203', and the third optical fiber 1204(3) is spliced to a second optical fiber 1204(2)' of distribution cable 1203'. The third optical fiber 1204(3)" of distribution cable 1203" is routed in an opposite direction to a second drop cable 1206(2)'. In other words, the first optical fiber 1204(1) of the first distribution cable 1203 extending in a first direction is routed to a first drop cable 1206(1), and the third optical fiber 1204(3)' of the second distribution cable 1203' extending in a second direction (opposite the first direction) is routed to a second drop cable 1206(2). It is noted that these distribution cables assemblies 1201, 1201' can be daisy-chained together in this fashion.

It will be apparent to those skilled in the art that various modifications and variations can be made without departing from the spirit or scope of the invention.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163.

Many modifications and other embodiments of the concepts in this disclosure will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A terminal end of a network, comprising:
   a terminal end transceiver configured to communicate with one or more end user devices; and
   a switch device configured to automatically route communication at the terminal end transceiver between a primary communication path and an auxiliary communication path depending on whether optical signals are received in the primary communication path, each of the primary communication path and the auxiliary communication path extending between the terminal end and a central office.

2. The terminal end of claim 1, further comprising an external switch device comprising the switch device, the external switch device plugged into the terminal end transceiver.

3. The terminal end of claim 2, wherein the external switch device comprises an optical switch configured to:
   detect optical signals in the primary communication path; and
   switch between the primary communication path and the auxiliary communication path depending on whether the optical signals are detected in the primary communication path.

4. The terminal end of claim 2, wherein the external switch device comprises an electrical switch configured to switch between the primary communication path and the auxiliary communication path depending on whether optical signals are received in the primary communication path.

5. The terminal end of claim 2, further comprising a conversion unit configured to convert optical signals to intermediate electrical signals.

6. The terminal end of claim 2, wherein the external switch device comprises a primary transceiver in optical communication with the primary communication path and an auxiliary transceiver in optical communication with the auxiliary communication path.

7. The terminal end of claim 6, further comprising a converter transceiver in selective communication with the primary transceiver and the auxiliary transceiver based on an electrical switch and configured to output optical signals to the terminal end transceiver.

8. The terminal end of claim 6, further comprising an electrical switch configured to switch between receivers of the primary transceiver and the auxiliary transceiver based on detection of electrical signals from the primary transceiver.

9. The terminal end of claim 6, wherein the external switch device is configured to disable transmission of the auxiliary transceiver based on a receiver loss signal of the primary transceiver.

10. The terminal end of claim 1, wherein the switch device comprises a microcontroller within the terminal end transceiver and the terminal end transceiver comprises a primary channel in communication with the primary communication path and an auxiliary channel in communication with the auxiliary communication path.

11. The terminal end of claim 10, wherein the terminal end transceiver comprises a unidirectional transceiver comprising a transmit optical fiber and a receive optical fiber for each of the primary channel and the auxiliary channel.

12. The terminal end of claim 10, wherein the terminal end transceiver comprises a bidirectional transceiver comprising a single optical fiber to transmit and receive for each of the primary channel and the auxiliary channel.

13. The terminal end of claim 1, wherein the terminal end is configured for at least one of a cellular network or a fiber to a home network.

14. The terminal end of claim 1, wherein the terminal end is a radio end comprising a base station and a radio head, the radio end part of a 5G cellular network and in optical communication with a central office and a fiber distribution hub.

15. The terminal end of claim 1, wherein the terminal end is a network interface device of a fiber to a home network and is in optical communication with a central office and a fiber distribution hub.

16. A method of using a terminal end of a network, comprising:
    receiving a communication signal at a terminal end transceiver from at least one of a central office or an end user device;
    automatically routing, by a switch device, the communication signal at the terminal end transceiver along a primary communication path with a central office; and
    automatically routing, by the switch device, the communication signal at the terminal end transceiver along an auxiliary communication path with the central office upon a cessation in the communication signal along the primary communication path.

17. A network, comprising:
    at least one distribution cable, comprising:
        a first distribution cable comprising a plurality of optical fibers including a first optical fiber, a second optical fiber, and a third optical fiber; and
        a second distribution cable comprising a plurality of optical fibers including a first optical fiber, a second optical fiber, and a third optical fiber, the second distribution cable spliced to the first distribution cable;
        wherein the plurality of optical fibers of the second distribution cable are offset from the plurality of optical fibers of the first distribution cable for relative indexing therebetween, such that the second optical fiber of the first distribution cable is spliced with the first optical fiber of the second distribution cable, and the third optical fiber of the first distribution cable is spliced with the second optical fiber of the second distribution cable.

18. The network of claim 17, wherein:
    the at least one distribution cable comprises a first distribution end and a second distribution end opposite the first distribution end; and
    the at least one distribution cable forms a loop such that the first distribution end and the second distribution end are each independently in optical communication with a data source.

19. The network of claim 17, wherein the network further comprises at least one of a cellular network or a fiber to a home network.

20. The network of claim 17,
    further comprising a third distribution cable comprising a plurality of optical fibers including a first optical fiber, a second optical fiber, and a third optical fiber, the third distribution cable spliced to the second distribution cable;
    wherein the second optical fiber of the second distribution cable is spliced with the first optical fiber of the third distribution cable.

* * * * *